United States Patent [19]

Isaka et al.

[11] Patent Number: 4,476,500
[45] Date of Patent: Oct. 9, 1984

[54] TRACKING APPARATUS

[75] Inventors: Takenobu Isaka, Hirakata; Kobayashi Masaaki, Kawanishi, both of Japan

[73] Assignee: Matsushita Electric Industrial Co., Ltd., Osaka, Japan

[21] Appl. No.: 297,085

[22] Filed: Aug. 27, 1981

[30] Foreign Application Priority Data

Sep. 1, 1980 [JP] Japan .................................. 55-121647

[51] Int. Cl.³ ............................................ H04N 5/783
[52] U.S. Cl. ........................................ 360/10.3; 360/78
[58] Field of Search .................... 360/10.1, 10.2, 10.3, 360/77, 70, 78

[56] References Cited

U.S. PATENT DOCUMENTS

| | | | |
|---|---|---|---|
| 4,143,405 | 3/1979 | Kubota | 360/10.2 |
| 4,148,083 | 4/1979 | Watanabe | 360/77 |
| 4,255,768 | 3/1981 | Kubota | 360/10.2 |
| 4,255,771 | 3/1981 | Kubota | 360/77 |
| 4,327,384 | 4/1982 | Tomita et al. | 360/77 |
| 4,356,522 | 10/1982 | Takano et al. | 360/77 |

Primary Examiner—Donald E. McElheny, Jr.
Attorney, Agent, or Firm—Wenderoth, Lind & Ponack

[57] ABSTRACT

A tracking apparatus for a video tape recorder having an auto-tracking servo system which enables plural video heads to be automatically on-track by means of the mechanical displacement of plural electro-mechanical conversion elements having the plural video heads respectively mounted thereon. When track-jumping occurs, the apparatus determines which of the plural heads is creating the track jumping and further determines the compensating direction needed to change the scanning track. The apparatus then controls the position of the head creating the track jumping so as to eliminate the track-jumping.

3 Claims, 10 Drawing Figures

FIG. 2.
PRIOR ART
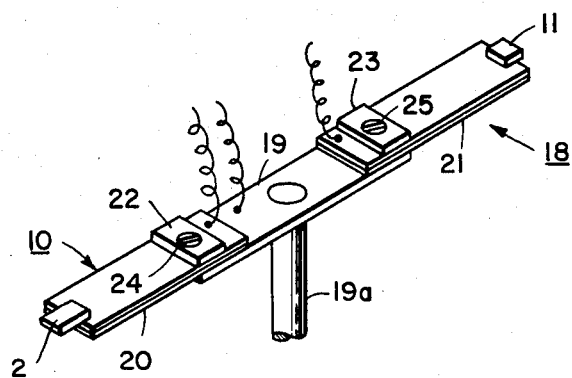
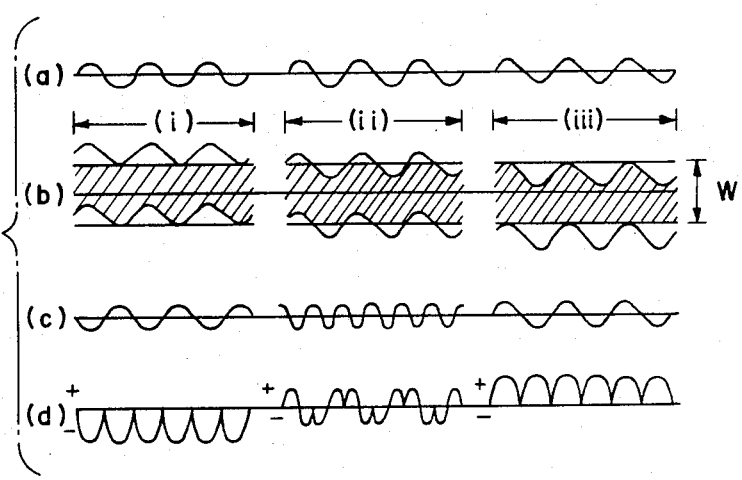
FIG. 3.
PRIOR ART
FIG. 4. PRIOR ART
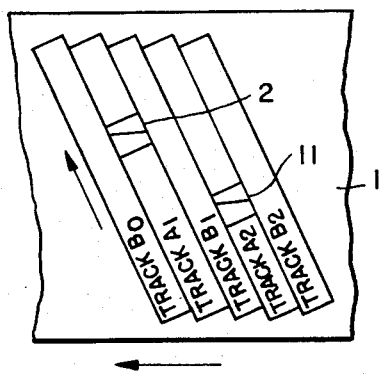

TRACKING APPARATUS

BACKGROUND OF THE INVENTION

This invention relates to a tracking apparatus for a helical scan type video tape recorder.

The so-called autotracking apparatus has been introduced for the purpose of allowing video heads to accurately scan a recorded track.

An autotracking apparatus can provide a reproduced picture without noise bands in a specific mode reproduction, such as slow speed reproduction or still reproduction at a running speed which is different from the tape running speed used during the recording. Such autotracking apparatus is so constructed that the usual video signal reproducing video heads are mounted on a movable unit having electro-mechanical conversion elements; a search signal (e.g. a sine-wave signal) which is used as drive signal is supplied to the electro-mechanical conversion elements, and the position of said video head with respect to the recorded track is determined from the search signal and a reproduction envelope of the video heads, so that a control loop is arranged to keep video heads on track.

In a case where the tracking apparatus of the above-noted system uses a plurality of video heads, each video head is controllable as above, on a basis of its reproduction envelope. Hence, it is impossible to determine if the video head has scanned a desired track or an adjacent track, thereby creating the problem of producing the so-called "track jumping".

SUMMARY OF THE INVENTION

The object of the present invention is to provide a tracking apparatus having an auto-tracking servo system which is constructed to allow a plurality of video heads to be automatically on-track by means of controlling the mechanical deviation of electro-mechanical conversion elements so that a video signal is reproduced from a magnetic tape on which said video signal of a given unit length is recorded as a recorded track having a predetermined inclination with respect to the lengthwise direction of travel of said magnetic tape, wherein said tracking apparatus includes a control means which, when at least one of said video heads scans an adjacent track rather than the desired track, the control means controls said plurality of video heads so as to scan the desired track as determined by the positional information and head determination information from said video heads.

BRIEF DESCRIPTION OF THE DRAWINGS

Hereinafter, the present invention will be described with reference to the drawings in which:

FIG. 2 is a perspective view exemplary of mounting video heads and electro-mechanical elements;

FIGS. 3(a)-(d) are waveforms for explaining the servo operation of auto-tracking apparatus of FIG. 1;

FIG. 4 is a view explanatory of the track-jumping condition of the video head;

DESCRIPTION OF THE PREFERRED EMBODIMENT

Figure 1:
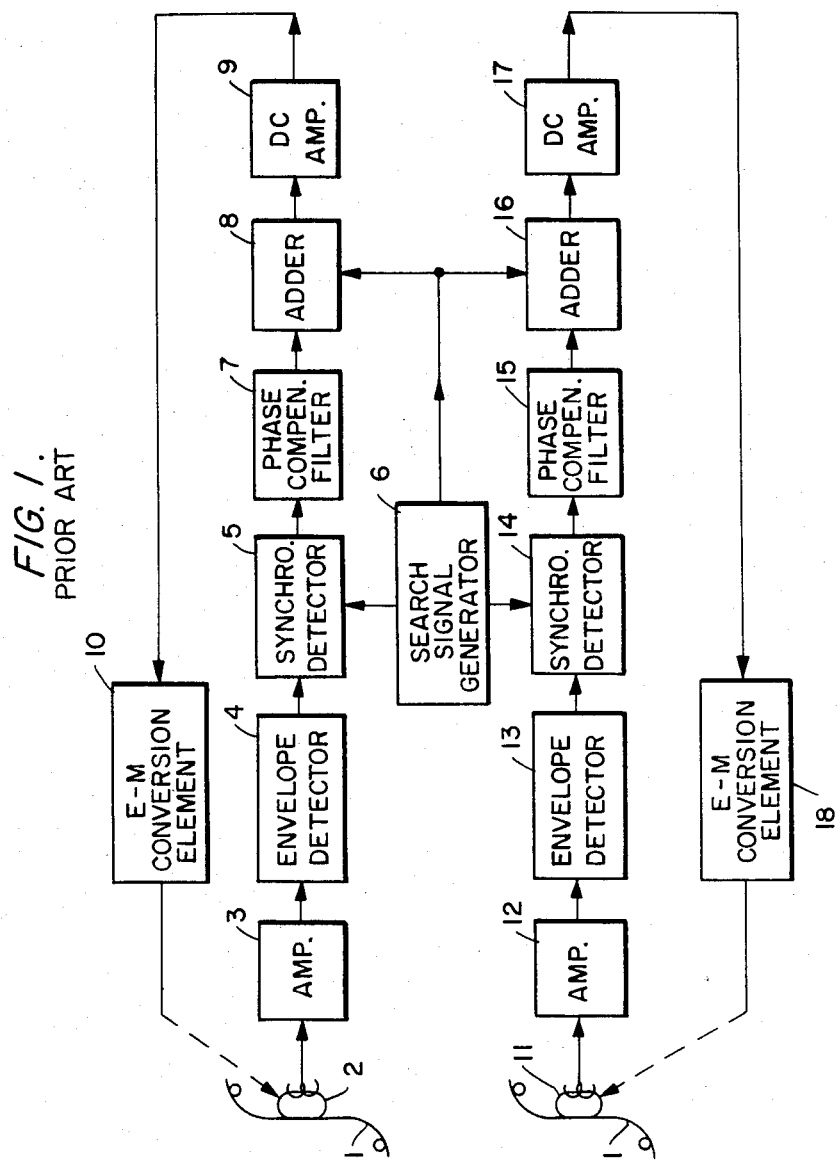
FIG. 1 is a block diagram of a principal portion of a conventional autotracking apparatus.

FIG. 1 is a block diagram of the principal portion of a conventional auto-tracking apparatus using a search signal which is supplied to a two head helical scan type video tape recorder.

In FIG. 1, RF signals reproduced by video heads 2 and 11 are fed to amplifiers 3 and 12. The reproduced signal is moderately amplified by amplifiers 3 and 12 are then fed to envelope detectors 4 and 13. Envelope detectors 4 and 13 are composed of normal diode detecting circuits and output envelope signals. Synchronous detectors 5 and 14 are fed the envelope signals from the envelope detectors 4 and 13 and a search signal generated by a search signal generator 6. Synchronous detectors 5 and 14 serve as multiplication units for multiplying their two input signals; the detection outputs of the detectors 5 and 14 are fed to respective input terminals of adders 8 and 16 through phase compensating filters 7 and 15 composed of, for example, low-pass filter units, and the search signal from the search signal generator 6 is fed to other respective input terminals of adders 8 and 16. The output signals from adders 8 and 16 drive electro-mechanical conversion elements 10 and 18 through DC amplifiers 9 and 17.

Now, electro-mechanical conversion elements 10 and 18 will be detailed in accordance with FIG. 2, showing a principal portion of the mechanical drive of the rotary heads including video heads 2 and 11. In the same drawing, at both ends of rotary base 19, which is mounted on a motor shaft 19a, piezo-electric elements 20 and 21 are fixed at each one terminal thereof through fixing plates 22 and 23 and fixing screws 24 and 25, and on the other end, i.e., movable end, of each piezo-electric element 20 and 21, the video heads 2 and 11 are mounted. The piezo-electric elements 20 and 21 comprise two piezo-electric bimorph vibrators having electrodes on both surfaces and affixed together and having their polarization directions defined lengthwise, so that when voltage is applied between the electrodes, the elements 20 and 21 each deflect (i.e.—are mechanically displaced) in the polarization direction corresponding to the intensity of the applied voltage.

Hence, video heads 2 and 11 mounted on piezo-electric elements 20 and 21 similarly deflect respectively.

In FIG. 1, video head 2, amplifier 3, envelope detector 4, synchronous detector 5, phase compensating filter 7, adder 8, DC amplifier 9, and electro-mechanical conversion element 10 constitute one automatic tracking servo loop and video head 11, amplifier 12, envelope detector 13, synchronous detector 14, phase compensating filter 15, adder 16, DC amplifier 17, and electro-mechanical conversion element 18 constitute a second automatic tracking servo loop. Referring to FIG. 3, operation of the autotracking servo loop will be detailed. Electro-mechanical conversion elements 10 and 18 are fed search signal a as shown in FIG. 3(a), an output signal from search signal generator 6, so as to vibrate, whereby video heads 2 and 11, while vibrating, scan a recorded track of a width W as shown in FIG. 3(b). Therefore, a portion shown by the oblique lines in the same drawing is the effective width of the track. In addition, in FIGS. 3(b), (c) and (d), a period (i) shows video head 2 or 11 shifting upwardly with respect to the track; period (ii) shows the heads on track, and period (iii) shows the heads track-shifting downwardly. The envelope detecting signal c as shown in FIG. 3(c), following the above, shows out of phase, two times frequency, and in-phase with respect to the search signal a in the respective periods (i), (ii), and (iii).

Next, the outputs of the synchronous detectors 5 and 14, which are multiplied by the search signal a and the envelope signal c, can obtain detection output waveforms d in the respective periods (i), (ii) and (iii) as shown in FIG. 3(d).

The detecting output waveform d represents the track-shifting direction, and supplies an error voltage to the piezo-electric element of each of the electro-mechanical conversion elements 10 and 18 which phase-compensates the feedback loop by the following phase-compensating filter so that the error voltage is reversed with respect to the track-shifting direction. Hence, a negative feedback loop, i.e., an auto-tracking servo loop is completed.

Since the aforesaid autotracking servo is in phase-comparison with the envelope signal with respect to the search signal, the video head 2 or 11, even when scanning a recorded track which is different from the desired track, will, if on-track, complete the feedback loop.

Referring to FIG. 4, in a case where the tracks $A_1$ and $A_2$ which are recorded on magnetic tape 1 by a video head with an azimuth angle of $+6°$ and the tracks $B_0$, $B_1$, and $B_2$ which are recorded on the same tape 1 by a video head with a azimuth angle of $-6°$, are reproduced by video heads 2 and 11 with an azimuth angle of $+6°$ during reproduction, video heads 2 and 11 are shown in condition of scanning different recorded tracks $A_1$ and $A_2$, that is, the "track jumping". Each recorded track records a video signal corresponding to one field such as $B_0$, $A_1$, $B_1$, $A_2$ or $B_2$. The occurrence of "track jumping" leads to alternate reproduction of recorded tracks $A_1$ and $A_2$ during the still reproduction, whereby a bad effect, such as the occurrence of a picture deflection or vertical movement of the picture, is created in spite of the still picture.

This invention is directed to the determination of when a video head is scanning the adjacent track and to the detection of the direction of a desired track when the aforesaid "track jumping" occurs, so that the detected information is used to control the electro-mechanical conversion element to thereby keep the video head on-track, thus intending to solve the problem in the conventional example. Next, an embodiment of the invention will be described in accordance with the drawings.

Figure 5:
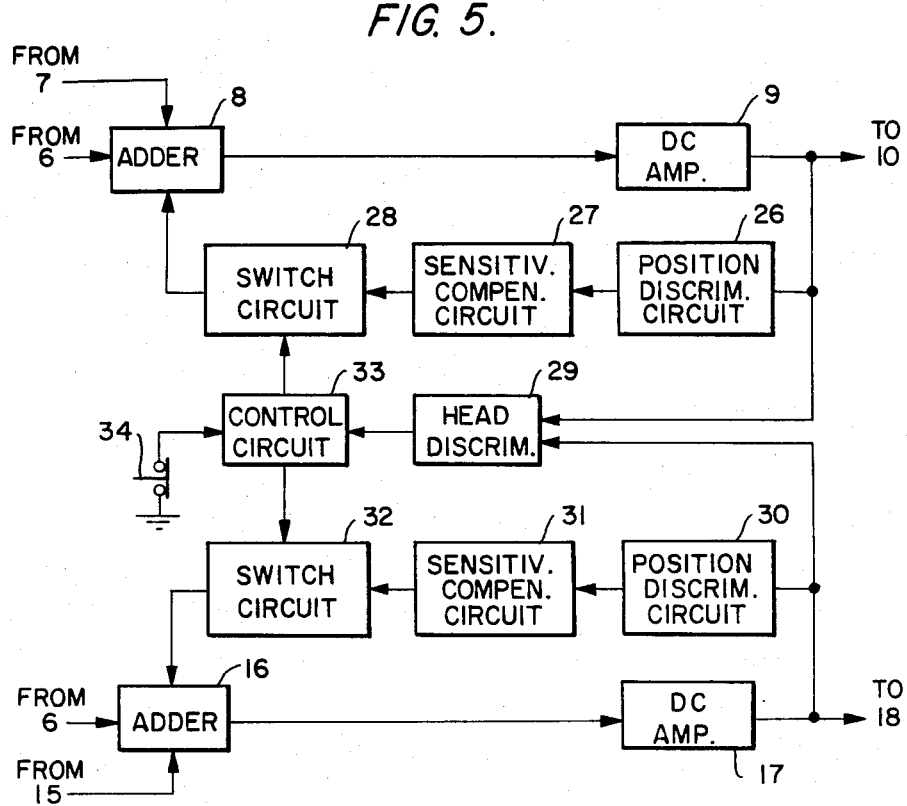
FIG. 5 is a block diagram of a principal portion of an embodiment of the present invention.

FIG. 5 is a block diagram of a principal portion, i.e., an auto-tracking servo loop, of an embodiment of the present invention, in which the same components as those in FIG. 1 are designated by the same reference numerals. The FIG. 1 construction is applicable to components other than those shown in FIG. 5, and such components are omitted from FIG. 5 for simplicity. In FIG. 5, the error voltage supplied to electro-mechanical elements 10 and 18, that is, the output voltages of DC amplifiers 9 and 17 as shown in FIGS. 1 and 2, are fed to position discriminating circuits 26 and 30 and to a head discriminating circuit 29.

The position discriminating circuits 26 and 30 determine the polarity of the voltage supplied to video heads 2 and 11, that is, to electro-mechanical elements 10 and 18. Now, assume that a voltage of a positive polarity is supplied and a voltage of a negative polarity is output from its output terminal. The head discriminating circuit 29 serves to perform a subtraction process with respect to the output voltage of respective DC amplifiers 9 and 17, in which the output voltage of DC amplifier 17 is subtracted from that of DC amplifier 9.

The outputs of the position discriminating circuits 26 and 30 are fed to the sensitivity compensating circuits 27 and 31. The sensitivity compensating circuits 27 and 31 convert the output voltages of the position discriminating circuits 26 and 30 into voltages corresponding to the sensitivity of electro-mechanical conversion elements and the recorded track pitch. The outputs of the sensitivity compensating circuits 27 and 31 are fed to the switch circuits 28 and 32. An output of a head discriminating circuit 29 is fed to a control circuit 33, which turns switch circuits 28 and 32 on and off by means of the output of head discriminating circuit 29 and a track-jumping compensating switch 34 to be hereinafter described.

Figure 6:
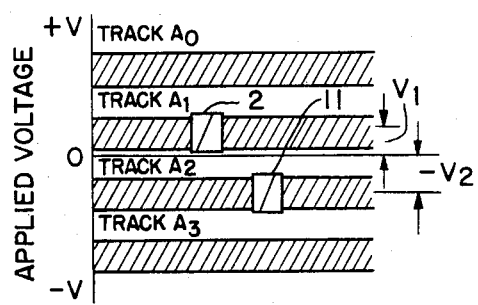
FIG. 6 shows the track-jumping of a video head with reference to the voltage supplied to an electro-mechanical conversion element.

Referring to FIG. 6, a voltage (i.e.—the amount of displacement) supplied to electro-mechanical conversion elements 10 and 18 with respect to the recorded tracks on magnetic tape 1 is shown widthwise with respect to each recorded track.

In addition, regarding the recorded tracks, since reproducing video heads 2 and 11 each have an azimuth angle of $+6°$, recorded tracks which have each been recorded at an azimuth angle of $+6°$ are shown, video head 2 scanning recorded track $A_1$ and video head 11 scanning recorded track $A_2$.

This represents the occurrence of track jumping. A voltage $V_1$ is supplied to electro-mechanical conversion element 10 so as to allow video head 2 to be put on recorded track $A_1$ and a voltage $-V_2$ is fed to electro-mechanical conversion element 18 so as to allow video head 11 to be put on recorded track $A_2$.

The track-jumping occurs essentially relatively, where the recorded track, on which a video head of a lower voltage supplied to electro-mechanical conversion element 10 or 18, is assumed to be a desired track. Hence, in the condition shown in FIG. 6, the head discriminating circuit 29 indicates video head 11. At that time, the position disriminating circuit 30 outputs voltage in the positive polarity direction, whereby the compensating voltage fed to adder 16 through sensitivity compensating circuit 31 and switch circuit 32, allows the electro-mechanical conversion element 18 to be upwardly displaced.

The switch 34 is manually operable and either inhibits or enables the operation of the control circuit 34. That is, an operator operates switch 34 to enable control circuit 34 when track-jumping is observed.

Figure 7:
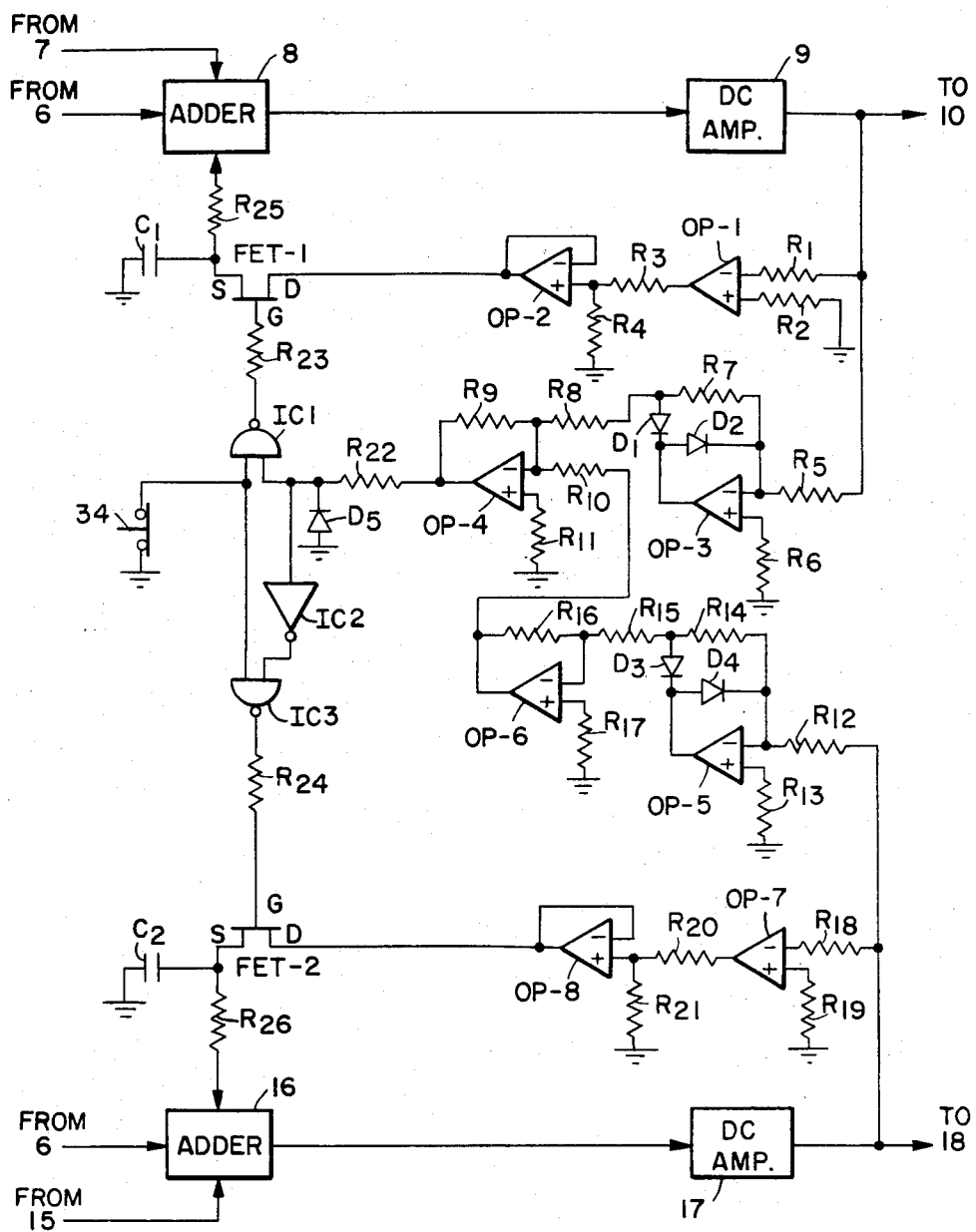
FIG. 7 is a circuit diagram of a concrete embodiment of the present invention.

FIG. 7 is a circuit diagram further concretely representing the FIG. 5 embodiment, in which position discriminating circuits 26 and 30 are shown to comprise an operational amplifier (to be hereinafter abbreviated as op-amp) OP-1, resistances $R_1$ and $R_2$, op-amp OP-7, and resistance $R_{18}$ and $R_{19}$, and which operate as comparators.

The voltage $V_1$ fed to the minus input terminal of op-amp OP-1 through resistance $R_1$ and fed to the electro-mechanical conversion element 10, is a constant voltage obtained at an output terminal of op-amp OP-1, the constant voltage being a saturation voltage which is about equal to the minus supply voltage, in other words, about $-11$ V, when the supply voltage is assumed to be $\pm 12$ V, because the plus input terminal of OP-1 is grounded through resistance $R_2$. Similarly, a voltage of +11 V is obtained at an output terminal of op-amp OP-7 because its minus input terminal is fed an input voltage of $-V_2$. The output voltages of op-amps OP-1 and OP-2 are converted into voltages which are fed to electro-mechanical conversion elements 10 and 18 through sensitivity compensating circuits 27 and 31 comprising resistances $R_3$ and $R_4$ and op-amp OR-2, or resistances $R_{20}$ and $R_{21}$ and op-amp OP-8, and which are suitable to shift video head 2 or 11 from the adjacent track to a desired one.

Resistances $R_5$, $R_6$, $R_7$, $R_8$, $R_9$, and $R_{11}$, and diodes $D_1$ and $D_2$, and op-amps OP-3 and OP-4, constitute the generally well-known absolute value circuit used to full-wave rectify the drive voltage fed to the electro-mechanical conversion element 10. Similarly, resistances $R_{12}$ to $R_{17}$, and diodes $D_3$ and $D_4$, and op-amps OP-5 and OP-6, full-wave rectify the drive voltage fed to the electro-mechanical element 18. In addition, an input signal fed to op-amp OP-4 through $R_8$ and that fed to op-amp OP-4 through resistance $R_{10}$ are added by op-amp OP-4, which acts as a subtractor because op-amp OP-6 is used as an inverter.

Now, op-amp OP-4 can output a saturation voltage of either a positive polarity or negative polarity corresponding to the voltage fed to the two electro-mechanical conversion elements 10 and 18, the saturation voltage being fed to one input terminal of a NAND circuit IC-1 through resistance $R_{22}$ and diode $D_5$, and also fed to one input terminal of a NAND circuit IC-3 through an inverter IC-2. The other input terminals of NAND circuits IC-1 and IC-3 are connected to a track-jumping compensating switch 34, so that when the two input terminals of NAND gate IC-1 or IC-3 are at a high level, its output terminal is a low level, thus producing the track-jumping compensating condition.

Next, P-channel type field-effect transistors FET-1 and FET-2 operate as switches so as to be conductive when 0 V is fed to their gate input terminals G through resistances $R_{23}$ and $R_{24}$, thereby supplying track-jumping compensating voltages to adders 8 and 16.

In addition, resistances $R_{25}$ and $R_{26}$ and capacitors $C_1$ and $C_2$ are time constant circuits arranged so as to newly generate the track-jumping by switching FET-1 or FET-2 when a stepped signal is fed to adders 8 and 16 through FET-1 and FET-2.

As seen from the above, this invention, when the track-jumping occurs, determines the head creating the track jumping and the compensating direction (voltage) needed to change the scanning track, thereby ensuring that the auto-tracking servo can put a plurality of video heads on the desired track, thus being considerably advantageous.

In addition, in the embodiment of the present invention, the reproduction of the recorded track of an azimuth angle is explained, but even when a recorded track of single azimuth angle with a guard band is reproduced, the track-jumping will occur, so that this invention is similarly applicable to compensation of the track-jumping.

What is claimed is:

1. A tracking apparatus for a video tape recorder having a closed-loop auto-tracking servo system which enables plural video heads to be automatically on-track by means of the mechanical displacement of plural electro-mechanical conversion elements having said plural video heads respectively mounted thereon, said closed-loop auto-tracking servo system producing a tracking error signal and including an adder means for adding a search signal produced by a search signal generator and said tracking error signal so as to thereby produce an on-tracking signal which is supplied to one of said plural electro-mechanical conversion elements, said tracking apparatus having a control means comprising:
   a position discriminating circuit for detecting the polarity of said on-tracking signal and for providing an output signal corresponding thereto;
   a sensitivity compensating circuit for converting said output signal from said position discriminating circuit to a modified output signal which corresponds to a predetermined displacement of one said plural electro-mechanical conversion elements;
   a head discriminating circuit for comparing said signal supplied to one of said plural electro-mechanical conversion elements with another signal which is supplied to another of said plural electro-mechanical conversion elements and for providing an output signal in accordance with said correspondence;
   a switch circuit for supplying said modified output signal from said senitivity compensating circuit to said adder in said auto-tracking servo system, said modified output signal of said sensitivity compensating circuit being added to said search signal and said tracking error signal by said added, said on-tracking signal being generated; and
   a control circuit operatively connected to a manually operable two state track-jumping compensating switch for controlling said switch circuit in accordance with said output signal from said head discriminating circuit and said state of said track-jumping compensating switch, thereby allowing one of said plural heads to scan a desired track.

2. An apparatus according to claim 1, wherein said plural heads comprise two heads.

3. An apparatus according to claim 2, wherein said head discriminating circuit includes a subtracting circuit for subtracting said signal supplied to one of said plural electro-mechanical conversion elements from said another signal which is supplied to another of said plural electro-mechanical conversion elements.

* * * * *